US011624662B2

United States Patent
Jackson et al.

(10) Patent No.: US 11,624,662 B2
(45) Date of Patent: Apr. 11, 2023

(54) EXHAUST GAS TEMPERATURE SENSOR

(71) Applicant: Unison Industries, LLC, Jacksonville, FL (US)

(72) Inventors: David Reece Jackson, Binghamton, NY (US); William Joseph Hendricks, Unadilla, NY (US); Cliff Burger, Binghamton, NY (US); John Patrick Parsons, Afton, NY (US)

(73) Assignee: Unison Industries, LLC, Jacksonville, FL (US)

( * ) Notice: Subject to any disclaimer, the term of this patent is extended or adjusted under 35 U.S.C. 154(b) by 1054 days.

(21) Appl. No.: 16/055,942

(22) Filed: Aug. 6, 2018

(65) Prior Publication Data

US 2020/0041353 A1   Feb. 6, 2020

(51) Int. Cl.
| | | |
|---|---|---|
| *G01K 1/14* | (2021.01) | |
| *G01K 13/02* | (2021.01) | |
| *F01D 25/30* | (2006.01) | |
| *G01K 13/024* | (2021.01) | |

(52) U.S. Cl.
CPC ............... *G01K 1/14* (2013.01); *G01K 13/02* (2013.01); *F01D 25/30* (2013.01); *G01K 13/024* (2021.01); *G01K 2205/04* (2013.01)

(58) Field of Classification Search
CPC ...... G01K 1/14; G01K 13/02; G01K 2205/04; G01K 2013/024; G01K 1/08; F01D 25/30; F01D 17/085
USPC ....... 374/148, 147, 100, 163, 110, 122, 137, 374/138, 141, 144, 208, 166, 179
See application file for complete search history.

(56) References Cited

U.S. PATENT DOCUMENTS

| | | | |
|---|---|---|---|
| 2,660,061 A | 11/1953 | Lewis | |
| 3,832,201 A | 8/1974 | Shearer | |
| 3,935,032 A | 1/1976 | Brandeberry | |
| 4,001,045 A | 1/1977 | Smith | |
| 4,499,330 A | 2/1985 | Pustell | |
| 4,871,263 A | 10/1989 | Wilson | |
| 5,653,538 A * | 8/1997 | Phillips | ................ G01K 13/02 374/135 |
| 5,662,418 A * | 9/1997 | Deak | ...................... G01K 7/02 374/144 |

(Continued)

FOREIGN PATENT DOCUMENTS

| | | |
|---|---|---|
| CN | 1721830 A | 1/2006 |
| CN | 101105327 A | 1/2008 |

(Continued)

OTHER PUBLICATIONS

Chinese Patent Office, Office Action re Corresponding Application No. 201910722524.4, dated Nov. 2, 2020, 9 pages, China.

(Continued)

*Primary Examiner* — Lisa M Caputo
*Assistant Examiner* — Janice M Soto
(74) *Attorney, Agent, or Firm* — McGarry Bair PC

(57) ABSTRACT

A temperature sensor assembly having a support tube defining an interior, a temperature sensor having a distal end and a proximal end located within the interior, and, a concentric ring surrounding at least a portion of the temperature sensor and the concentric ring is positioned between the temperature sensor and the support tube for holding the temperature sensor in the support tube.

14 Claims, 5 Drawing Sheets

(56) References Cited

U.S. PATENT DOCUMENTS

| | | | |
|---|---|---|---|
| 6,059,453 A | 5/2000 | Kempf | |
| 6,325,535 B1 | 12/2001 | Gibson | |
| 7,004,626 B1 | 2/2006 | Giberson | |
| 7,553,078 B2 | 6/2009 | Hanzawa et al. | |
| 7,824,100 B2 | 11/2010 | Sakami | |
| 8,039,729 B2 | 10/2011 | Nguyen | |
| 8,864,375 B2 | 10/2014 | Abe et al. | |
| 9,416,731 B2 | 8/2016 | Berkland | |
| 2008/0317092 A1* | 12/2008 | Bard | G01K 13/02 374/115 |
| 2019/0186283 A1* | 6/2019 | Boyd | F01D 17/085 |

FOREIGN PATENT DOCUMENTS

| | | | |
|---|---|---|---|
| CN | 101632007 A | | 1/2010 |
| CN | 203365011 U | * | 12/2013 |
| CN | 203365011 U | | 12/2013 |
| CN | 205079881 U | | 3/2016 |
| CN | 107271070 A | | 10/2017 |
| CN | 206756337 U | | 12/2017 |
| CN | 207132985 U | | 3/2018 |
| EP | 26078712 A2 | | 6/2013 |
| JP | H0419486 Y2 | | 4/1986 |

OTHER PUBLICATIONS

Intellectual Property Office, Combined Search and Examination Report Under Sections 17 and 18(3) re Application No. GB1910613.7, dated Jan. 28, 2020, 8 pages. South Wales, NP.

* cited by examiner

EXHAUST GAS TEMPERATURE SENSOR

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as airplanes or helicopters. In airplanes, gas turbine engines are used for propulsion of the aircraft.

During operation of a turbine engine, gas temperature at the exit of the engine can be measured by an exhaust gas temperature (EGT) sensor. EGT can be used to measure the performance of the engine as the temperature of components of the engine, such as the turbine blades, provide an indication of the rate of deterioration of those components. EGT sensors are located downstream from the highest temperature sections of the engine. Therefore, it is necessary that the EGT sensor can accurately measure exhaust gas temperatures with minimal degradation of the sensor components.

BRIEF DESCRIPTION OF THE INVENTION

In one aspect, the disclosure relates to a temperature sensor assembly including a support tube defining an interior, a temperature sensor having a distal end and a proximal end located within the interior, and a concentric ring surrounding at least a portion of the temperature sensor and wherein the support tube surrounds at least a portion the concentric ring and temperature sensor and the concentric ring is positioned between the temperature sensor and the support tube for holding the temperature sensor in the support tube.

In another aspect, the disclosure relates to an aircraft turbine engine, including a core having a compressor, combustor, and turbine sections in axial flow arrangement mounted in a casing, a temperature sensor having a distal end and a proximal end and located downstream of the combustor, a concentric ring surrounding at least a portion of the temperature sensor, and a support tube surrounding at least a portion the concentric ring and temperature sensor and wherein the concentric ring is positioned between the temperature sensor and the support tube for holding the temperature sensor in the support tube.

In yet another aspect, the disclosure relates to a method of centering a temperature sensor having a distal end and a proximal end in a support tube having at least one outflow exhaust gas aperture in a housing positioned in a the casing downstream of a combustor in an aircraft turbine engine, the method including inserting a concentric ring over the distal end of the temperature sensor, sliding the concentric ring over and above the at least one outflow exhaust gas aperture, sliding the support tube over the concentric ring and the temperature sensor such that the concentric ring is centered in the support tube and the concentric ring is positioned between the proximal end of the temperature sensor and the at least one outflow exhaust gas aperture.

DESCRIPTION OF EMBODIMENTS OF THE INVENTION

Figure 1:
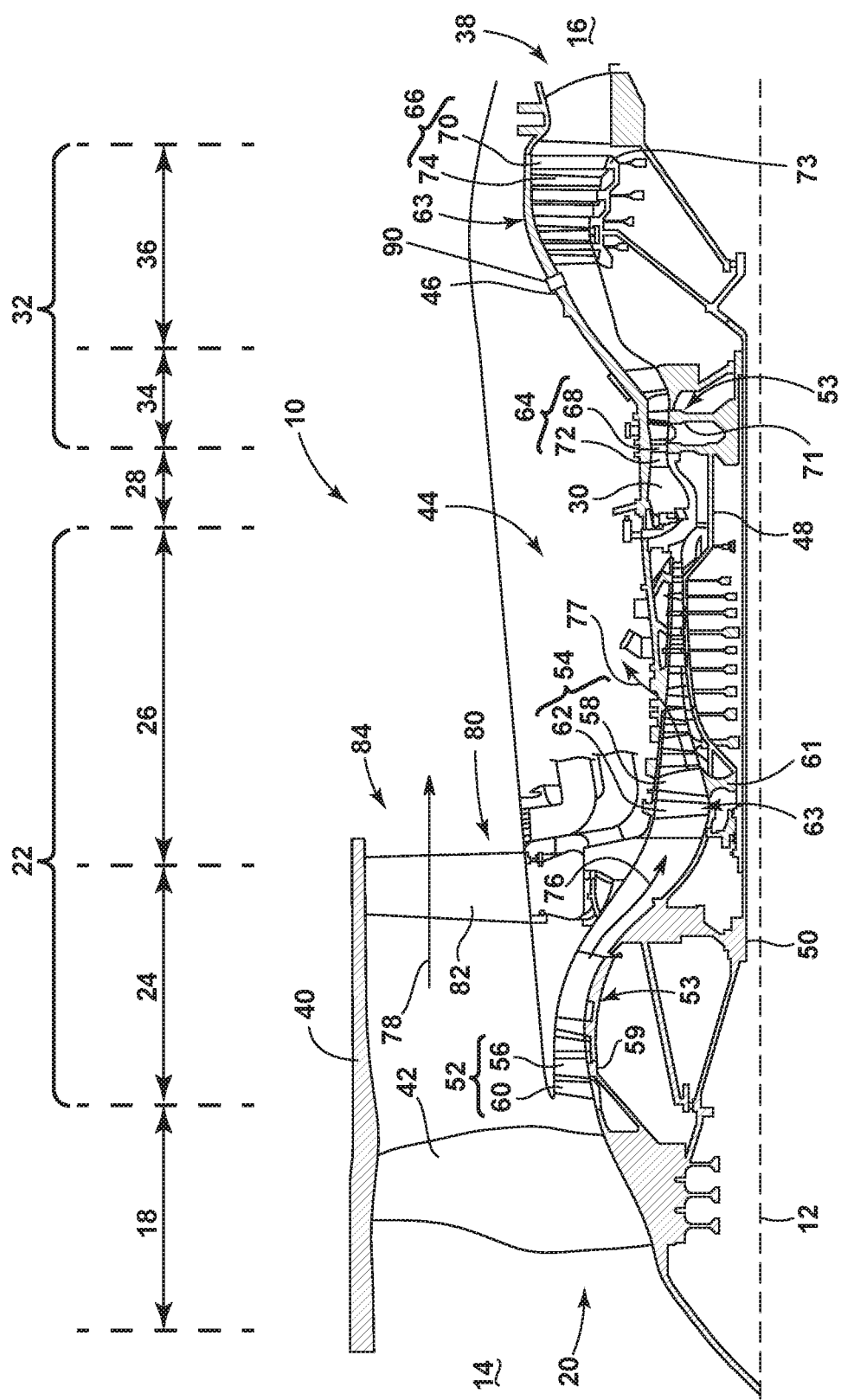
FIG. 1 is a schematic cross-sectional diagram of a turbine engine for an aircraft with an exhaust gas temperature sensor.

The described embodiments of the present disclosure are directed to an air temperature sensor for an aircraft turbine engine. It will be understood, however, that the disclosure is not so limited and may have general applicability within an engine, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference. A "set" as used herein can include any number of a particular element, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40. A temperature sensor 90 can be in the form of an exhaust gas temperature (EGT) sensor 90 disposed in the core casing 46 directly upstream the LP turbine 36 and downstream the combustor 30 as shown; however, this example is not meant to be limiting and the EGT sensor 90 may be positioned in other locations in the turbine engine 10.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
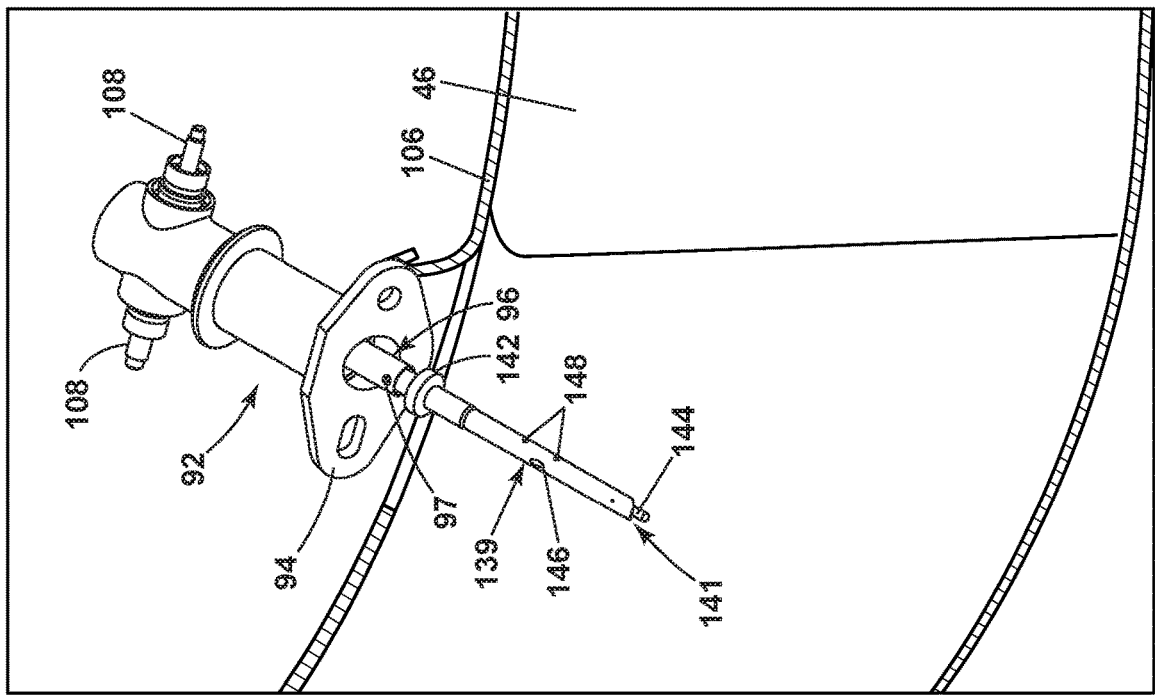
FIG. 2 is an enlarged isometric view of the exhaust gas temperature sensor in a partially cut-away portion of the engine of FIG. 1

FIG. 2 more clearly depicts the EGT sensor 90 in a cut away portion 106 of the core casing 46. A mounting section 92 having a suitable mounting portion 94 can be included in the EGT sensor 90. The mounting portion 94 is coupled with a temperature sensor assembly 139. In one example, a plunger 96 couples the mounting portion 94 to the temperature sensor assembly 139. The plunger 96 can include mounting bosses 97 to facilitate the coupling. While not shown, a wiring housing can be included in the mounting section 92 and can be coupled to an electrical conduit. The mounting section 92 can be any suitable mounting portion 94 and is not meant to be limiting. A tube inlet 108 can couple to the housing 102 and can be coupled to a source of hot bleed air.

Figure 3:
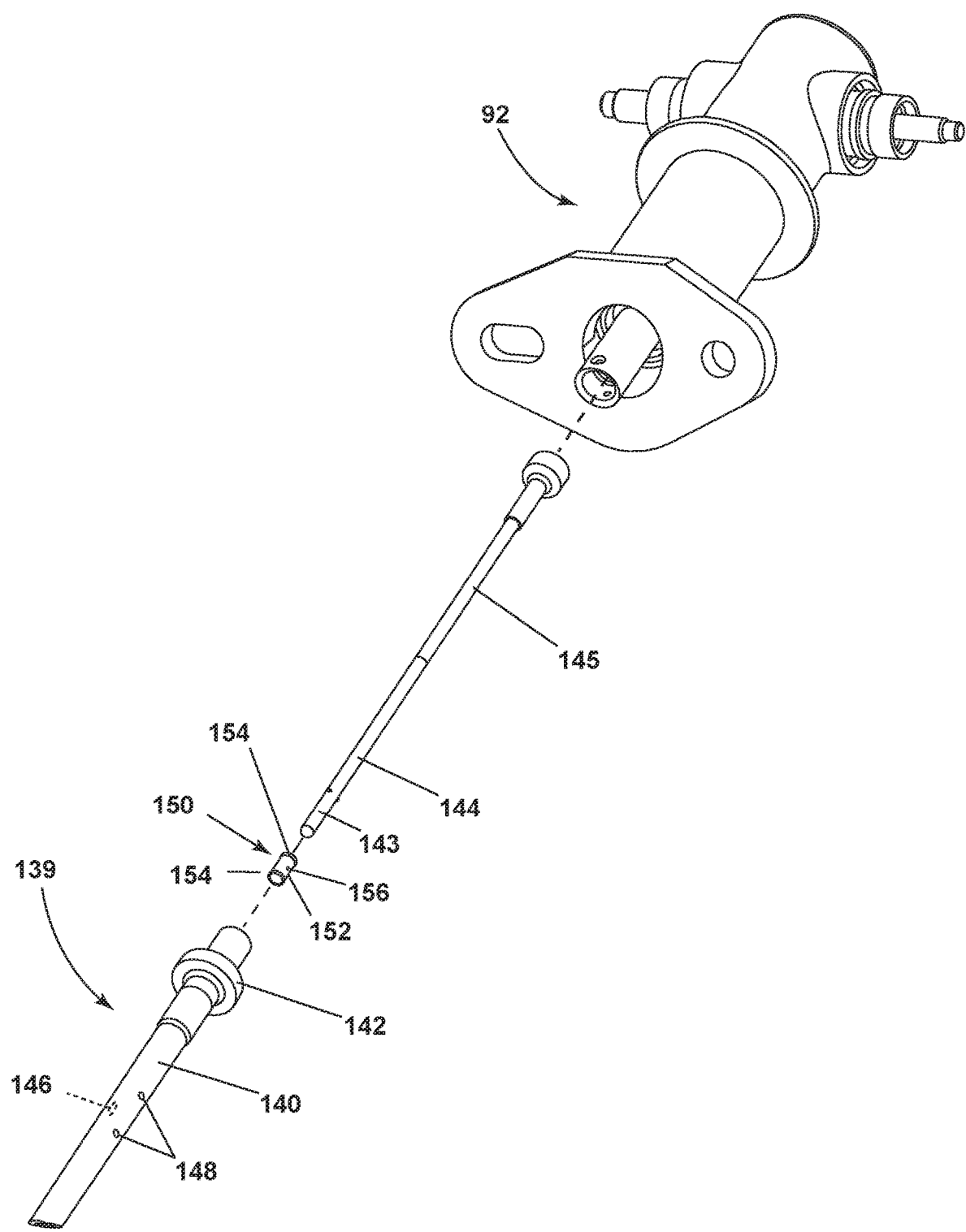
FIG. 3 is an exploded view of the exhaust gas temperature sensor of FIG. 2.

Turning to FIG. 3, an exploded view of the temperature sensor assembly 139 is illustrated. The temperature sensor assembly 139 includes a hollow, cylindrical, support tube 140, a temperature sensor 144, and a concentric ring 150. The temperature sensor 144 is any temperature sensor suitable for use on an aircraft or within the engine 10.

The support tube 140 can further include a locking mechanism 142 that can be in the form of an annular flange. The support tube 140 can define an interior 141 where at least housing inlet 146 and at least one housing outlet 148 can fluidly couple an exterior of the housing to the interior 141. The inlet 146 can be in the form of an aperture that allows an inflow of exhaust gas, while the outlet 148 can be in the form of an aperture that allows an outflow of exhaust gas. In one example, the support tube 140 includes a single, stadium shaped oval inlet 146, and a pair of circular outlets 148 that can be less than 180 degrees apart. For example, the pair of outlets 148 can be positioned 90 degrees from the inlet 146. Further, the pair of outlets 148 can be in vertical alignment along the support tube 140. More specifically, the pair of outlets 148 can be equally spaced about the inlet 146 such that the distance from one outlet 148 to the inlet 146 is the same as the other outlet 148 to the inlet 146.

The temperature sensor 144 can be provided in the interior 141 of the support tube 140 and can include a distal end 143 and a proximal end 145. The proximal end 145 can be adjacent the locking mechanism 142 while the distal end 143 can be opposite the proximal end 145.

The concentric ring 150 can be in the form of a hollow, cylinder, having a body 152 with a diameter less than the diameter of the support tube 140, but greater than the diameter of the temperature sensor 144. An aperture 156 can be provided on the body 152 near a center of the concentric ring 150 configured for a plug weld. The plug weld can allow for welding the concentric ring 150 to the temperature sensor 144. While the concentric ring 150 is illustrated as having an aperture 156 for a plug weld, it is also possible to attach the concentric ring 150 to the temperature sensor 144 by any suitable method, such as brazing, staking, or crimping.

Additionally, circumferential contact junctions 154 can be provided on each end of the concentric ring 150. The contact junctions 154 can be in the form of an annular flange having a diameter greater than the body 152, and less than the support tube 140. In another example, the contact junctions 154 can be in the form of axial fins that protrude from the diameter of the body 152. Thus, the contact junctions 154 can be raised relative to the concentric ring 150 body 152.

Figure 4:
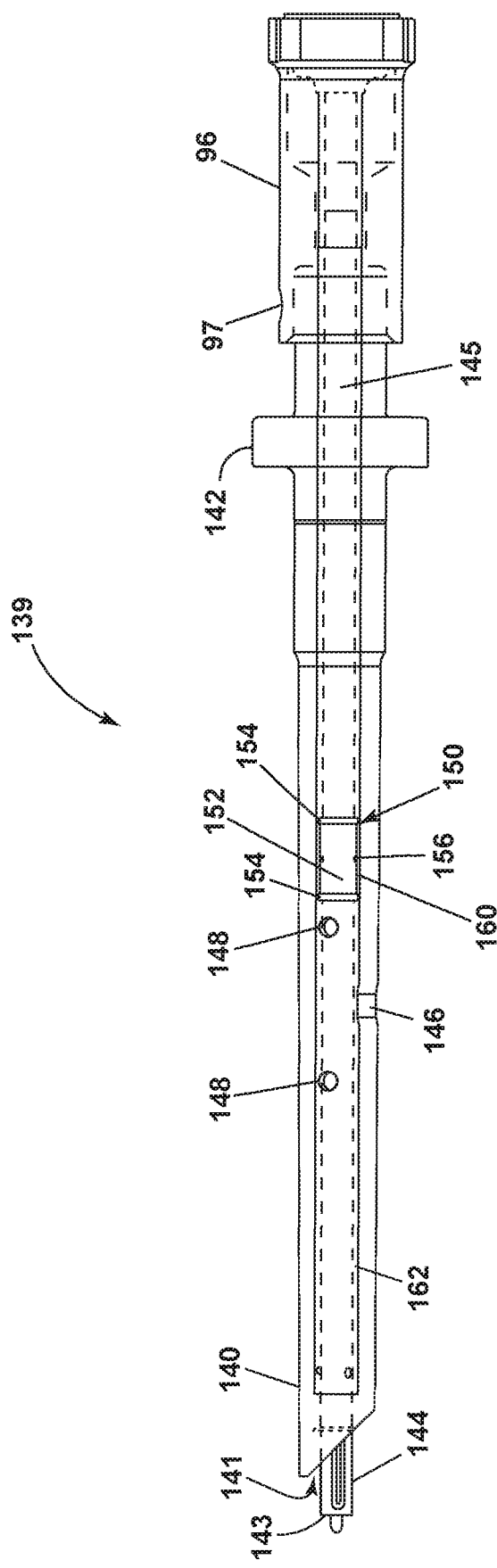
FIG. 4 is a side view of the exhaust gas temperature sensor of FIG. 2 with transparent portions.

More specifically, when assembled, as in FIG. 4, the distal end 143 of the temperature sensor 144 can protrude, or extend from the support tube 140. In one example, the temperature sensor 144 has a longer length than the support tube 140. The concentric ring 150 can surround a portion of the temperature sensor 144 and fit within the interior 141 of the support tube 140. In one example, the concentric ring 150 is positioned between the proximal end 145 of the temperature sensor 144, which is also the proximal end of the support tube 140, and the at least one outlet 148. The contact junctions 154 can be in contact with the support tube 140, while the body 152 is not in contact with the support tube 140 such that a gap 160 is formed between the body 152 and the support tube 140. Furthermore, the contact junctions 154 allow for a reduction in the thermal mass of the concentric ring 150, which can be made of a high temperature resistant material.

Since the concentric ring 150 positioned between the temperature sensor 144 and the support tube 140, the concentric ring 150 can hold the temperature sensor 144 within the interior 141 of the support tube 140 while maintaining a uniform gap 162 between the support tube 140 and the temperature sensor 144. Thus, the concentric ring 150 can enable the temperature sensor 144 to be centered within the interior 141. Centering the temperature sensor 144 within the support tube 140 can allow exhaust gas to flow into contact evenly around the temperature sensor 144 and within the interior 141 via the inlet 146 to provide for a reliable EGT temperature reading by the temperature sensor 144. The pair of outlets 148 allow exhaust gas to flow out of the gap 162 and away from the temperature sensor 144. In one example, the gap 162 can be about 0.381 millimeters (0.015 inches).

Figure 5:
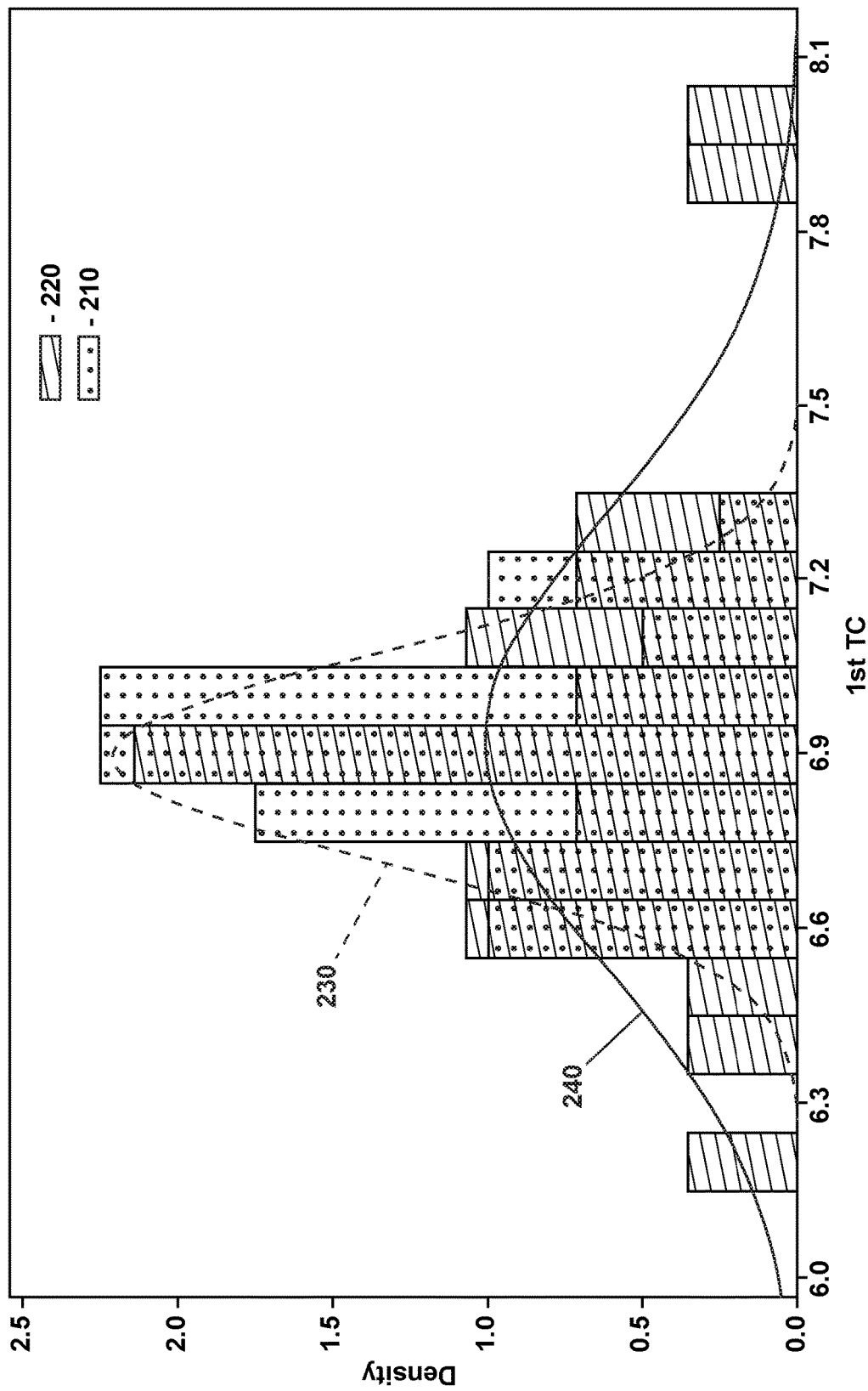
FIG. 5 schematic view of a graph illustrating time response of test samples with a concentric ring and without a concentric ring.

Turning to FIG. 5, a graph is illustrated that shows the increased reliability of the temperature sensor readings with the concentric ring 150. The graph illustrates the variation, measured by the standard deviation, in time response of temperature sensor test samples with the concentric ring 150 and without the concentric ring 150. Test samples with the concentric ring 150 are illustrated by the dotted pattern 210 and test samples without the concentric ring 150 are illustrated by the striped pattern 220. The temperature sensor samples were tested at the same wind tunnel flow speed. The x-axis illustrates a $1s^t$ Time Constant, in seconds, which represents how fast the temperature sensors respond to a change in temperature. Specifically, the $1s^t$ Time Constant is the amount of time it takes for the temperature sensor to register 63.2% of the steady-state value with a step change in temperature. The y-axis illustrates the density, or proportion, of test samples that register 63.2% of the steady-state value.

The standard deviation normal distribution, or bell curve for the samples with the concentric ring 150 is illustrated by the dotted line 230, and the standard deviation normal distribution, or bell curve for the samples without the concentric ring 150 is illustrated by the solid line 240. Standard deviation 230 for the samples with the concentric ring 250 is the least spread out distribution. Therefore, standard deviation 240 has the lowest standard deviation. The standard deviation 230 can be about 0.1803, while the standard deviation 240 can be about 0.3951. Thus, the standard deviation 230 of temperature sensor test samples with the concentric ring 150 is approximately one-half of the variation of the temperature test samples without the concentric ring 150.

A method of centering a temperature sensor 144 sensor having a distal end 143 and a proximal end 145 in a support tube 140 having at least one outflow exhaust gas aperture 148 positioned downstream of a combustor 30 in an aircraft turbine engine 10 as described herein can include, inserting a concentric ring 150 over the distal end 143 of the temperature sensor 144 and sliding the concentric ring 150 over and above the at least one outflow exhaust gas aperture 148. Further, the method can include sliding the support tube 140 over the concentric ring 150 and the temperature sensor 144 such that the concentric ring 150 is centered in the support tube 140 and the concentric ring 150 is positioned between the proximal end 145 of the temperature sensor 144 and the at least one outflow exhaust gas aperture 148. Additionally, the method can include wherein the concentric ring 150 further comprises circumferential contact junctions 154 at each end of the concentric ring 150 for contacting the support tube 140.

Benefits associated with the disclosure discussed herein include centrally locating and supporting a thermocouple element within a support tube, or housing, for maximizing the time response performance of the thermocouple element, or temperature sensor. If the thermocouple element is too close to inlet or exhaust holes, flow though the housing can be impeded and the time response performance of the temperature sensor can be reduced. In extreme cases where a thermocouple element is in contact with the housing, flow can be almost entirely impeded. Further benefits can include a concentric ring that is a simple and easily installed while reducing scrap and re-work.

It should be understood that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A temperature sensor assembly comprising:
a support tube defining an interior;
a temperature sensor having a distal end and a proximal end located within the interior; and
a concentric ring having a body and circumferential contact junctions that comprise one of a plurality of fins and flanges spaced around the body and raised relative to the body and surrounding at least a portion of the temperature sensor and wherein the support tube surrounds at least a portion the concentric ring and the temperature sensor and the concentric ring is positioned between the temperature sensor and the support tube for holding the temperature sensor in the support tube wherein the plurality of one of fins and flanges comprise a gap between adjacent of one of fins and flanges allowing exhaust gas to flow between the gap and axially along the temperature sensor.

2. The temperature sensor assembly of claim 1 further comprising a gap between the support tube and the temperature sensor for allowing exhaust gas to flow into contact with the temperature sensor.

3. The temperature sensor assembly of claim 2 wherein the concentric ring centers the temperature sensor in the support tube.

4. The temperature sensor assembly of claim 2 wherein the support tube further comprises an inflow exhaust gas aperture for allowing exhaust gas to flow into the gap to contact the temperature sensor.

5. The temperature sensor assembly of claim 4 wherein the support tube further comprises at least one outflow exhaust gas aperture to allow exhaust gas to flow out of the gap away from the temperature sensor.

6. The temperature sensor assembly of claim 5 wherein the at least one outflow exhaust gas aperture comprises two exhaust gas apertures equally spaced about the inflow exhaust gas aperture.

7. The temperature sensor assembly of claim 6 wherein the two exhaust gas apertures are positioned 90 degrees from the inflow exhaust gas aperture.

8. The temperature sensor assembly of claim 5 wherein the concentric ring is positioned between the proximal end of the support tube and the at least one outflow exhaust gas aperture.

9. The temperature sensor assembly of claim 1 wherein the circumferential contact junctions contact the support tube.

10. The temperature sensor assembly of claim 1 wherein the concentric ring further comprises an aperture centered in the concentric ring for allowing a plug weld.

11. The temperature sensor assembly of claim 1 wherein the body is elongated and the circumferential contact junctions are located at each end of the body of the concentric ring.

12. An aircraft turbine engine, comprising: a core having a compressor, combustor, and turbine sections in axial flow arrangement mounted in a casing; a temperature sensor having a distal end and a proximal end and located downstream of the combustor; a concentric ring having a body and circumferential contact junctions that comprise one of a plurality of fins and flanges spaced around the body and raised relative to the body and surrounding at least a portion of the temperature sensor; and a support tube surrounding at least a portion the concentric ring and the temperature sensor; and wherein the concentric ring is positioned between the temperature sensor and the support tube for holding the temperature sensor in the support tube and wherein the plurality of fins and flanges comprise a gap between adjacent of one of fins and flanges allowing exhaust gas to flow between the gap and axially along the temperature sensor.

13. The aircraft turbine engine of claim 12 further comprising a gap between the support tube and the temperature sensor for allowing exhaust gas to flow into contact with the temperature sensor.

14. The aircraft turbine engine of claim 13 wherein the concentric ring centers the temperature sensor in the support tube.

* * * * *